United States Patent
Panasik et al.

(10) Patent No.: US 6,872,042 B2
(45) Date of Patent: Mar. 29, 2005

(54) KNURLED FASTENER WITH CUTTING EDGES AND REMOVABLE HEAD

(75) Inventors: Cheryl L. Panasik, Elburn, IL (US); Kenneth R. Levey, West Chicago, IL (US); David B. Speer, Winnetka, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/431,959

(22) Filed: May 8, 2003

(65) Prior Publication Data

US 2004/0223830 A1 Nov. 11, 2004

(51) Int. Cl.[7] ............................................. F16B 15/02
(52) U.S. Cl. ................... 411/481; 411/451.1; 411/922; 411/923; 411/5
(58) Field of Search ........................... 411/923, 451.1, 411/451.3, 451.4, 451.5, 453, 455, 456, 421, 424, 481, 922, 2, 3, 5

(56) References Cited

U.S. PATENT DOCUMENTS

| | | | | |
|---|---|---|---|---|
| 1,699,421 A | * | 1/1929 | Bean | 411/481 |
| 2,075,411 A | * | 3/1937 | Von Mertens | 411/453 |
| 2,095,153 A | * | 10/1937 | Rosenberg | 411/453 |
| 2,269,708 A | * | 1/1942 | Dickson | 411/453 |
| 4,718,802 A | * | 1/1988 | Rockenfeller et al. | 411/421 |
| 5,489,179 A | | 2/1996 | Gabriel et al. | |
| 5,658,109 A | | 8/1997 | Van Allman et al. | |
| 5,741,104 A | | 4/1998 | Lat et al. | |
| 5,749,692 A | * | 5/1998 | Kish et al. | 411/453 |
| 5,851,153 A | | 12/1998 | Van Allman et al. | |
| 6,062,788 A | * | 5/2000 | Ying-Feng | 411/480 |
| 6,171,042 B1 | | 1/2001 | Olvera et al. | |
| 6,203,442 B1 | | 3/2001 | Olvera et al. | |
| 6,322,307 B1 | * | 11/2001 | Glover | 411/412 |
| 2002/0071741 A1 | | 6/2002 | Oswald | |

FOREIGN PATENT DOCUMENTS

FR          1 115 028 A      4/1985

* cited by examiner

Primary Examiner—Flemming Saether
(74) Attorney, Agent, or Firm—Lisa M. Soltis; Mark W. Croll; Donald J. Breh

(57) ABSTRACT

A novel fastener comprises a head having a recess for receiving a rotary driver, a shank having knurls defined by generally helical grooves and intersecting generally annular grooves, wherein a plurality of the knurls include a lateral cutting edge, and a generally pointed tip. Another novel fastener comprises a head having a recess for receiving a rotary driver, a shank having a predetermined diameter small enough so that the head will break away from said shank upon application of a predetermined torque, and said shank having knurls defined by generally helical grooves and intersecting generally annular grooves.

6 Claims, 1 Drawing Sheet

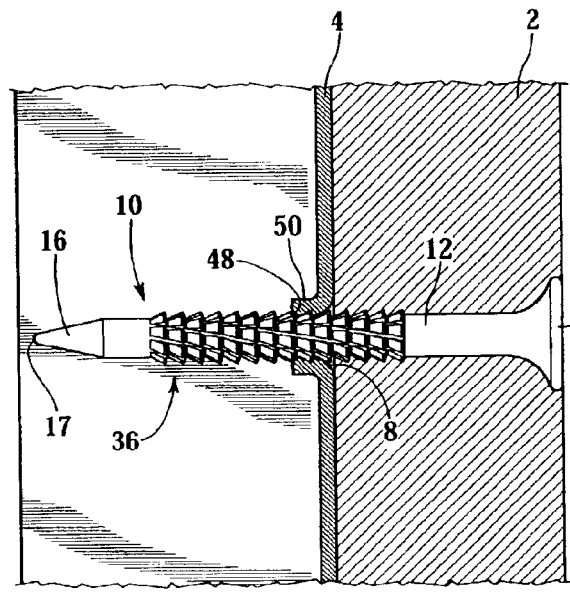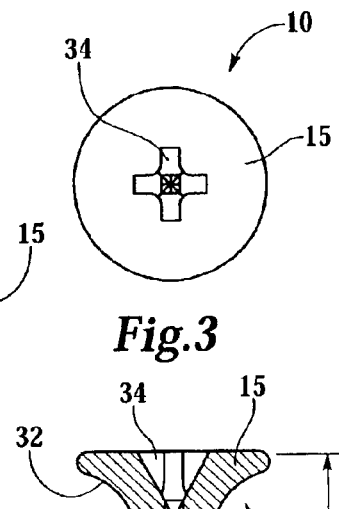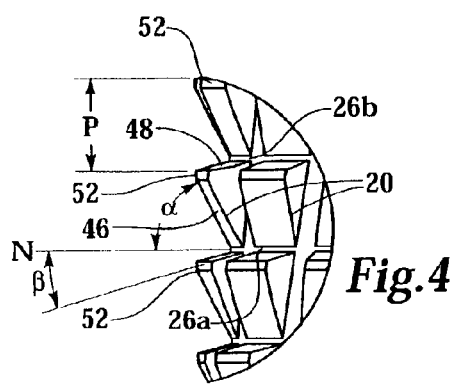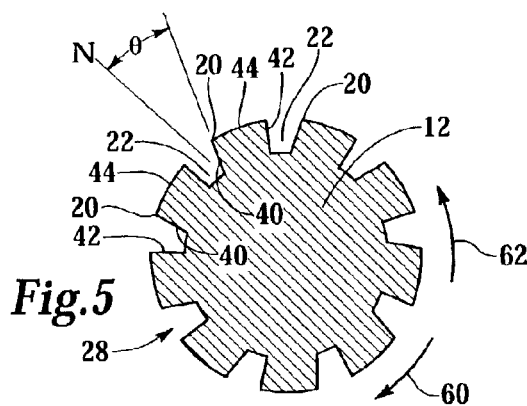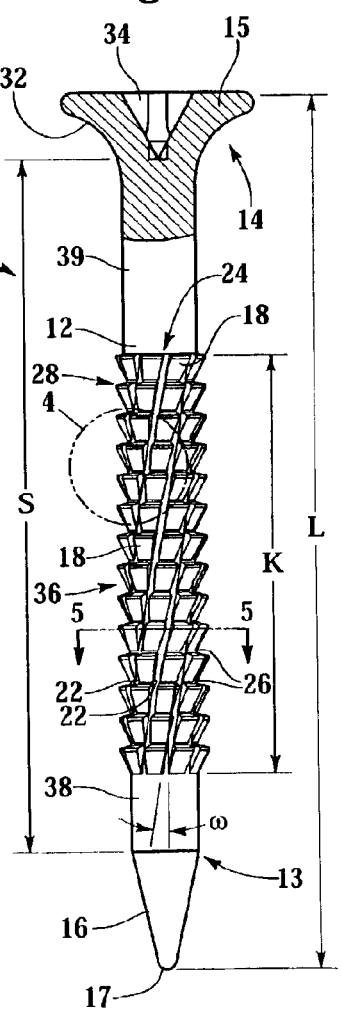

KNURLED FASTENER WITH CUTTING EDGES AND REMOVABLE HEAD

BACKGROUND OF THE INVENTION

1. Field of the Invention

The present invention is directed to a fastener having a unique configuration along its shank and useful primarily for fastening a work piece to a metal substrate.

2. Description of the Related Art

Fasteners of various configurations are known for fastening relatively thick work pieces, such as drywall, to various substrates, such as metal framing members. Commonly, such fasteners have elongate shanks defining axes and include smooth and flat heads to be axially driven by power tools, such as pneumatically-powered or combustion-powered tools.

Fasteners for fastening a work piece to a metal substrate are shown in U.S. Pat. No. 5,489,179 to Gabriel et al., U.S. Pat. No. 5,741,104 to Lat et al., and U.S. Pat. Nos. 6,171,042 and 6,203,442 to Olvera et al., all assigned to the assignee of this application, and published U.S. patent application Ser. No. 2002/0071741 to Oswald. These references show fasteners with knurling on their shanks that typically includes helical grooves for channeling dust and rotating the fastener as it is driven and annular grooves for engaging with the substrate for high pullout strength.

However, because of this high pullout strength, it is difficult to remove the work piece for electrical work or plumbing without damaging or destroying the work piece, particularly if the work piece is gypsum drywall, because the fastener has to be pried out of the work piece with a hammer or other prying tool with enough force to overcome the pullout strength. This damage and destruction can be very undesirable, particularly if the work piece is merely being removed temporarily, in which case an entirely new work piece would have to be installed, requiring considerable added material costs.

One might think that the helical grooves would allow the fastener to be rotated to disengage it from the metal substrate, but it has been found that the fastener merely spins in place and does not become disengaged because the annular grooves remain engaged with the metal substrate and because the helical grooves are not threads. The pitch of the helical grooves is designed for channeling dust and for increasing pullout strength, not for threaded disengagement.

What is needed is a fastener for fastening a work piece to a substrate that can be removed without damaging the work piece.

BRIEF SUMMARY OF THE INVENTION

In accordance with the present invention, a novel fastener includes an elongate shank, a head and a generally pointed tip, the head having a recess for receiving a rotary driver, and the shank including generally helical grooves and intersecting generally annular grooves defining knurls, wherein a plurality of the knurls include a lateral cutting edge and a leading portion tapered toward the generally pointed tip.

Also in accordance with the present invention, a novel fastener includes an elongate shank having a predetermined diameter, a head having a recess for receiving a rotary driver, and a generally pointed tip, the shank having generally helical grooves and intersecting generally annular grooves defining knurls, a plurality of said knurls including a leading portion tapered toward said generally pointed tip said predetermined diameter being small enough so that said head will break away from said shank upon application of a predetermined torque.

These and other objects, features and advantages are evident from the following description of an embodiment of the present invention, with reference to the accompanying drawings.

BRIEF DESCRIPTION OF THE SEVERAL VIEWS OF THE DRAWINGS

FIG. 1 is partial side-sectional view of a fastener having a knurled shank.

FIG. 2 is a partial side sectional view of the fastener installed in a work piece and a support member.

FIG. 3 is a top view of a head of the fastener.

FIG. 4 is an enlarged view of knurls on the knurled shank, taken along section line 4 in FIG. 1.

FIG. 5 is a cross-section of the knurled shank taken along line 5—5 in FIG. 1.

DETAILED DESCRIPTION OF THE INVENTION

Referring to FIGS. 1 and 2, a fastener 10 is shown for fastening a work piece 2 to a support member 4. The inventive fastener 10 includes a head 15 having a recess 34 for receiving a rotary driver (not shown) and a knurled shank 12 having generally helical grooves 22 and intersecting generally annular grooves 26 defining knurls 18 on shank 12, and a plurality of the knurls 18 include a lateral cutting edge 20 for cutting, reaming, filing or shaving material away from support member 4.

Fastener 10 includes cutting edges 20 on knurls 18, best seen on FIGS. 4 and 5, for providing a strong grip between fastener 10 and support member 4. Improved knurls 18 of the present invention also advantageously allow for an improved means of disengagement between fastener 10 and support member 4. After fastener 10 has been installed, as shown in FIG. 2, if it is desired that it be removed, an operator uses a rotary driver (not shown) to engage with a recess 34 in head 15 of fastener 10 and attempts to rotate the fastener 10. Advantageously, either cutting edges 20 will cut or file material away from a thin metal support member 4, allowing fastener 10 to be disengaged with support member 4, or the rotary driver will break off head 15 for a thick metal support member 4, so that work piece 2 can be pulled over exposed shanks 12, allowing work piece 2 to be unfastened from support member 4 without being damaged or destroyed.

Work piece 2 may be made from wood, plywood, oriented stand board, other wood-like materials, cement board, plaster board, insulation board or other substrates used in the construction industry. Preferably, work piece 2 is sheathing used in the construction industry that is fastened to a support member 4 of a building. Examples of preferred sheathing are gypsum board such as ToughRock Sheathing or Dens-Glass Gold Gypsum manufactured by Georgia Pacific or insulation board. Work piece 2 is typically relatively thicker than support member 4.

Support member 4 can be one of many supporting studs used in the construction industry, an example being a galvanized steel framing stud having a thickness between 20 gauge (about 0.036 inches thick) and 12 gauge (about 0.105 inches thick). Support member 4 is typically relatively thinner than work piece 2. A thinner metal support member 4, such as steel that is 17 gauge (about 0.054 inches thick)

or thinner, can be cut by cutting edges 20, while a thicker metal support member 4, thicker than 17 gauge, engages tightly with knurled shank 12 so that head 15 is broken off when fastener 10 is attempted to be rotated by the rotary driver.

Returning to FIG. 1, fastener 10 includes an elongate shank 12 defining an axis, a leading end 13 and a trailing end 14. An enlarged head 15 is formed at trailing end 14 and a generally pointed tip 16 is formed at leading end 13. The length L of fastener 10 should be long enough so that knurls 18 will engage with support member 4. In one embodiment, fastener 10 has a total length L of between about 1 inch and about 2 inches, and preferably about 1.5 inches. Fastener 10 can also be designed for much thicker work pieces, so that the length L is up to about 8 inches or longer.

Head 15 of fastener 10 can be of any configuration so long as it provides a suitable hold on the outer surface 6 of work piece 2. In a preferred embodiment, shown in FIG. 1, head 15 is a bugle head wherein a transition 32 curves outwardly gradually from shank 12 to head 15. The diameter of head 15 is significantly larger than the diameter of shank 12 so that head 15 will provide a strong hold against work piece 2. In one embodiment, the diameter of head 15 is between about 2 times and about 3 times larger, and preferably about 2.6 times larger than the diameter of shank 12 In one embodiment, the diameter of head 15 is between about 0.25 inches and about 0.4 inches, preferably about 0.32 inches.

Head 15 includes a recess 34 for receiving a rotary driver (not shown) such as a bit of a power screwdriver or the tip of a conventional screwdriver so that fastener 10 can be rotated when it is desired to disengage fastener 10. Recess 34 can be one of several standard configurations, so long as the rotary driver will be able to apply enough torque to rotate fastener 10. Examples of configurations of recess 34 include a flat tip or flat head recess, an Allen recess for receiving an Allen wrench tip, a Phillips Square Drive (PSD) recess to accommodate a bit such as Illinois Tool Works Inc. part number 1588910, or a T-30 6 lobe recess to accommodate a bit such as Illinois Tool Works Inc. part number 18000910. In a preferred embodiment, shown in FIG. 3, recess 34 is a standard Phillips recess for receiving a Phillips head screwdriver or bit.

Continuing with FIG. 1, a generally pointed tip 16 is formed at leading end 13 of shank 12. In a preferred embodiment, generally pointed tip 16 is generally conical in shape except for a generally rounded point 17. Tip 16 could also be of an ogive shape. It is preferable that tip 16 not have too sharp of a point so that it will not bend over during heat treatment of fastener 10 or upon penetration into support member 4.

Shank 12 includes a knurled portion 36 having generally helical grooves 22 and intersecting generally annular grooves 26 defining knurls 18. Shank 12 also includes a generally cylindrical unknurled leading section 38 between knurled portion 36 and tip 16 and a generally cylindrical unknurled trailing section 39 between knurled portion 36 and head 15. The diameter of shank 12 should be large enough to provide a strong hold, but small enough to be easily driven into work piece 2 and support member 4. In one embodiment, unknurled portions 38, 39 of shank 12 have a diameter of between about 0.08 inches and about 0.15 inches. Preferably trailing section 39 has a diameter of about 0.12 inches and leading section 28 has a smaller diameter of about 0.11 inches.

Knurled portion 36 extends along a significant portion of shank 12. In one embodiment, the total length S of shank 12 between head 15 and tip 16 is between about y1 inch and about 1½ inches, preferably about 1⅛ inches, and the length K of knurled portion 36 is between about ⅞ inches and about 1¼ inches, preferably about 1 inch. Knurled portion 36 should be long enough that it reaches support member 4 when fastener 10 is installed so that knurls 18 are adjacent to support member 4. Knurled portion 36 includes generally helical grooves 22 and generally annular grooves 26. Generally helical grooves 22 intersect generally annular grooves 26 to define knurls 18. Knurls are configured to provide for high pullout strength between fastener 10 and support member 4 and a plurality of the knurls 18 include cutting edges 20 to cut material from support member 4 when an installed fastener 10 is rotated to allow fastener 10 to be removable without damaging work piece 2.

In one embodiment, the outer diameter of knurled portion 36 is larger than the diameter of unknurled sections 38, 39 so that the diameter of a hole 8 formed in support member 4 is smaller than the outer diameter of knurled portion 36 so that knurls 18 will grip support member 4. In a preferred embodiment, the outer diameter of knurls 18 is between about 1.1 and about 1.35 times larger, and preferably about 1.2 times larger than the diameter of trailing section 39.

In one embodiment, the outer diameter of knurled portion 36 is largest nearest to head 15 and gradually decreases in diameter along the length of knurled portion 36 toward tip 16. In a preferred embodiment, the outer diameter of knurled portion 36 nearest head 15 is between about 0.13 inches and about 0.16 inches, preferably between about 0.14 inches and about 0.15 inches, and still more preferably about 0.145 inches and the diameter decreases between about 0.003 and about 0.01 inches, preferably between about 0.005 and about 0.008 inches per inch of length starting from head 15 and moving toward tip 16 so that the outer diameter of knurled portion 36 nearest tip 16 is between about 0.12 inches and about 0.155 inches, preferably between about 0.13 inches and about 0.145 inches, and still more preferably between about 0.137 inches and about 0.140 inches.

Continuing with FIG. 1, generally helical grooves 22 are included on knurled portion 36 to cause fastener 10 to rotate slightly as it is driven into work piece 2, which increases the pullout strength between installed fastener 10 and support member 4. Generally helical grooves 22 are arranged in a circumferential array, and in one embodiment, generally helical grooves 22 are evenly spaced laterally around the perimeter of shank 12. In a preferred embodiment, shown in FIG. 1, generally helical grooves 22 are right hand helices so that when fastener 10 is driven into work piece 2 and support member 4, fastener 10 will rotate slightly in a clockwise direction from the perspective of the installer.

Annular grooves 26 engage with support member 4 to provide for higher pullout strength of fastener 10. A trailing portion 48 of knurls 18 adjacent to annular grooves 26, described below, engage with support member 4 after fastener 10 has been driven to provide more strength between knurls 18 and support member 4.

Returning to FIG. 1, in one embodiment, generally helical grooves 22 spiral around shank 12 at a generally constant helical angle ù. In a preferred embodiment, helical angle ù is between about 5° and about 11°, preferably about 8°. A helical angle ù of about 8° has been found to allow for optimum grip between knurled portion 36 and support member 4. Generally helical grooves 22 have a width of between about 0.005 inches and about 0.015 inches, and preferably about 0.01 inches.

A set of knurls 18 between adjacent generally helical grooves 22 form a generally helical rib 24, and a set of knurls between adjacent generally annular grooves 26 form a generally annular ring 28. In a preferred embodiment, there are between seven and eleven, and preferably nine generally helical grooves 22 and generally helical ribs 24, and there are between fifteen and twenty five, and preferably twenty or twenty one, generally annular grooves 26 and generally annular rings 28.

Preferably each knurl 18 in knurled portion 36 includes a cutting edge 20 to ensure that no matter how deep fastener 10 is driven, the knurls 18 adjacent to support member 4 will include a cutting edge 20 to cut away material. However, it is not necessary that every knurl 18 include cutting edge 20. For example, the knurls 18 of only seven of the nine generally helical ribs 24, or only the knurls 18 of the generally annular rings 28 that are expected to be adjacent to support member 4 could include cutting edges 20, and fastener 10 will still cut material from support member 4 allowing fastener 10 to be removed without damaging work piece 2.

Turning to FIG. 5, in a preferred embodiment each knurl 18 includes a cutting surface 40 on a lateral side of knurl 18, and a surface 42 on a lateral side of knurl 18 opposite cutting surface 40 and an outer surface 44 between cutting surface 40 and opposite surface 42. There is a lateral cutting edge 20 between cutting surface 40 and outer surface 44, wherein cutting edge 20 cuts material away from support member 4 as fastener 10 is rotated. In one embodiment, shown best in FIG. 4, cutting edge 20 runs along substantially the entire length of knurl 8 to provide a longer cutting edge 20 to cut material from support member 4.

Returning to FIG. 5, cutting surface 40 is facing generally in a rotationally leading direction and is inclined radially outwardly from shank 12 and in a rotationally trailing direction. Preferably, fastener 10 is rotated in the rotationally leading direction when it is desired that fastener 10 be disengaged with support member 4. In a preferred embodiment, cutting surface 40 is on a counterclockwise edge of each knurl 18, fastener 10 is rotated in a counterclockwise direction 62 by an operator to disengage fastener 10 and cutting surface 40 is inclined in a clockwise direction so that cutting surface 40 inclines in a direction opposite to the direction of rotation of fastener 10.

In one embodiment, cutting surface 40 is inclined in a rotationally trailing direction, shown as clockwise in FIG. 5, and forms an angle e with a line N normal to shank 12 and wherein opposite surface 42 on knurl 18 is generally normal to generally helical groove 22. In a preferred embodiment, cutting surface 40 is inclined from normal line N at an angle è that is between about 15° and about 25°, and preferably is about 20°. Cutting edge 20 on angled cutting surface 40 acts to cut at support member 4 and work piece 2.

Turning to FIG. 4, a plurality of knurls 18 also include a leading portion 46 that is tapered toward tip 16 and a trailing portion that faces generally toward head 15. Tapered leading portions 46 of knurls 18 allow fastener 10 to be driven into work piece 2 and support member 4 without undue interference from knurls 18. Trailing portions 48 allow for a strong grip between knurls 18 and support member 4 by engaging with a lip 50 that forms around the hole 8 formed in support member 4 when fastener 10 is driven, as shown in FIG. 2.

Leading portion 46 tapers from a crest 52 of knurl 18 toward tip 16 until it reaches a leading generally annular groove 26a, as shown in FIG. 4. In a preferred embodiment, tapered leading portion 46 is generally frusto-conical in shape and defines a comparatively large acute angle á with a line N normal to the axis of shank 12 (see FIG. 4). Trailing portion 48 angles radially inwardly from crest 52 toward a trailing generally annular groove 26b. In a preferred embodiment, trailing portion 48 is also generally frusto-conical in shape and defines a comparatively small acute angle â with normal line N.

In one embodiment, leading angle á is between about 60° and about 70°, and preferably about 65° and trailing angle â is between about 0°, wherein trailing portion 48 is generally perpendicular to the axis of shank 12, and about 20°, and preferably about 15°. In one embodiment, the pitch P, best seen in FIG. 4, between the crests 52 of knurls 18 in adjacent generally annular rings 28 is between about 0.03 inches and about 0.07 inches, and preferably is about 0.05 inches.

Fastener 10 is preferably driven into work piece 2 and support member 4 (see FIG. 2) by a powered fastener driving tool (not shown) such as a pneumatically-powered or combustion-powered tool which drives fastener 10 with a piston. As fastener 10 is driven, generally helical grooves 22 and generally helical ribs 24 cause fastener 10 to rotate slightly. In the embodiment shown in FIG. 2, wherein generally helical grooves 22 and generally helical ribs 24 are right hand helices, fastener 10 is rotated slightly in a clockwise direction 60 from the perspective of the operator, shown in FIG. 5.

Preferably, fastener 10 is driven so that head 15 bears against and is partially countersunk into work piece 2, as shown in FIG. 2 and so that tip 16 is driven through support member 4 so that shank 12 forms a generally annular lip 50 projecting toward tip 16 so that lip is disposed around knurled portion 36.

In a preferred embodiment, support member 4 is made from galvanized steel or another suitable metal so that support member 4 has sufficient resiliency and memory for lip 50 when disposed around knurled portion 36 to have an inner diameter that is smaller than the outer diameter of an annular ring 28 nearest to lip 50, so that trailing portions 48 of knurls 18 engage with lip 50 and create a high pullout strength between fastener 10 and support member 4.

Cutting edges 20 or break-away head 15 on knurls 18 and recess 34 allow for an improved means of disengaging fastener 10 with support member 4. After fastener 10 has been installed and it is desired that it be removed, an operator uses a rotary driver (not shown), such as a screwdriver, a power screwdriver, or a drill equipped with a screwdriver bit, and engages the rotary driver with recess 34 in head 15. The rotary driver attempts to rotate fastener 10 and one of two outcomes occur.

The first outcome occurs if support member 4 is made from thick metal, such as steel that is thicker than 17 gauge (greater than 0.054 inches thick). In this situation, knurls 18 engage tightly with support member 4 to prevent rotation of fastener 10. However, the torque exerted on fastener 10 by the rotary driver eventually causes head 15 to break off of shank 12. The predetermined diameter of shank 12 is small enough so that head 15 will break away from shank 12 upon application of a predetermined torque on shank 12. In one embodiment, manual torque provided by an operator using a standard screwdriver is sufficient because the grip between knurls 18 and support member is so strong. After the removal of heads 15 of all fasteners 10 attaching work piece 2 to support member 4, work piece 2 can simply be pulled over shanks 12 of fasteners 10 and shanks 12 can be pounded through support member 4, such as with a hammer.

The second outcome occurs if support member 4 is made from a thin metal, such as steel that is 17 gauge or thinner or less strong materials, such as a wooden support stud. In this case, the rotational grip between fastener 10 and support member 4 is not as strong and the rotary driver successfully rotates fastener 10. Knurled portion 36 rotates within the hole 8 in support member 4, cutting edges 20 cut material from support member 4 as fastener 10 remains generally in the same position, eventually causing hole 8 to become larger. Because there is not a strong rotational grip between knurls 18 and support member 4, the predetermined torque that would break away head 15 is not encountered by shank 12, so head 15 does not break away, rather the torque is transferred to the support member 4 as material is cut away.

Once enough of support member 4 has been cut away, fastener 10 can be pulled out without damage to work piece 2. Fastener 10 typically has to be rotated for a plurality of rotations before cutting edges 20 have cut away enough of support member 4 to disengage fastener 10. It has been found that a powered rotary driver has to rotate fastener 10 for one full second, or longer, before fastener 10 will become disengaged with support member 4 and will be able to be removed.

In a preferred embodiment, fastener 10 is designed so that it will be rotated in a counterclockwise direction 62 with respect to the operator, shown in FIG. 5. It is preferred that cutting edges 20 are on a lateral side of knurls 18 so that when fastener 10 is rotated in the counterclockwise direction 62, knurls 18 turn toward cutting edges 20. This design is preferred because the convention for fasteners is to turn them clockwise to install and tighten, and counterclockwise for removal. Further, it has been found that knurled shank 12 should rotate toward cutting edges 20 for maximum cutting efficiency.

Fastener 10 may be made from a generally cylindrical wire of carbon steel, such as 1030 carbon steel, by forming head 15 on the wire, and rolling the wire with dies to form knurled portion 36 and tip 16. An example of methods of making steel fasteners are disclosed in U.S. Pat. Nos. 5,658,109, 5,851,153, 6,171,042 and 6,203,442, all assigned to the assignee of this application, the disclosures of which are incorporated herein by reference.

It is preferred that fastener 10 be heat treated after it is formed. In one embodiment, fastener 10 is heat-treated to a core hardness of 40 to 45 Rockwell C and to a surface hardness of 42 to 50 Rockwell C. It is critical that the hardness of fastener 10, particularly of knurls 18 and cutting edges 20, be hard enough to be able to cut a metal support member 4. If fastener 10 is not heat treated, cutting edges 20 do not remove enough material to allow fastener 10 to be pulled out of engagement with support member 4.

After heat treating, fastener 10 can be coated with one or more protective layers for corrosion resistance, preferably being coated successively with a zinc layer, a chromate conversion layer, and a polymeric layer. Fastener 10 can be coated by methods similar to those described in U.S. Pat. Nos. 4,964,774, 5,489,179, and 5,741,104, all assigned to the assignee of this application, the disclosures of which are incorporated herein by reference.

The fastener of the present invention allows for the removal of a work piece fastened to a support member without damaging the work piece, allowing the work piece to be reused. The novel fastener includes a knurled shank, a generally pointed tip, and a head having a recess for receiving a rotary driver, the knurled shank includes generally helical grooves and intersecting generally annular grooves which define knurls, and a plurality of the knurls include a leading portion tapered toward the tip and a cutting edge for cutting material from the support member.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention should therefore not be limited by the above described embodiment, but by all embodiments within the scope and spirit of the invention.

What is claimed is:

1. A fastener for removably fastening a work piece to a steel member comprising:

an elongate shank having an axis, a head for receiving an axial impact for driving said fastener axially forwardly, said head having a recess for receiving a rotary driver, and a generally pointed tip;

said shank having generally helical grooves for imparting clockwise rotation as said fastener is driven axially forwardly, wherein said generally helical grooves intersect generally annular grooves defining knurls, a plurality of said knurls each including a trailing portion angled no more than about 20 degrees from normal for increased pullout strength, a lateral cutting edge for cutting away said steel member when said fastener is rotated in a counterclockwise direction by said rotary driver, and an axially leading portion angled between about 60 degrees and about 70 degrees from normal and tapered toward said generally pointed tip.

2. A fastener according to claim 1, wherein each lateral cutting edge is on a lateral cutting surface, said cutting surface facing in a counterclockwise direction and being inclined in a clockwise direction.

3. A fastener according to claim 1, wherein said fastener is heat treated.

4. A fastener for removably fastening a work piece to a steel member comprising:

an elongate shank having an axis, a head for receiving an axial impact for driving said fastener axially forwardly, said head having a recess for receiving a rotary driver, and a generally pointed tip;

said shank having generally helical grooves for imparting clockwise rotation as said fastener is driven axially forwardly, wherein said generally helical grooves intersect generally annular grooves defining knurls, a plurality of said knurls each including a trailing portion for increased pullout strength, a lateral cutting edge for cutting away said steel member when said fastener is rotated in a counterclockwise direction by said rotary driver, and an axially leading portion tapered toward said generally pointed tip;

wherein each lateral cutting edge is on a lateral cutting surface, said cutting surface facing in a counterclockwise direction and being inclined in a clockwise direction; and;

wherein said cutting surface is inclined in said counterclockwise direction from a line normal to said shank by between about 15 degrees and about 25 degrees.

5. A fastener for removably fastening a work piece to a steel substrate comprising:

an elongate shank having an axis, a head for receiving an axial impact for driving said fastener axially forwardly, said head having a recess for receiving a rotary driver, and a generally pointed tip;

said shank having generally helical grooves for imparting clockwise rotation as said fastener is driven axially forwardly, wherein said generally helical grooves intersect generally annular grooves defining knurls, a plurality of said knurls each including a trailing portion angled no more than about 20 degrees from normal for increased pullout strength, a lateral cutting edge, and a leading portion angled between about 60 degrees and about 70 degrees from normal and tapered toward said generally pointed tip; and wherein said shank has a predetermined diameter that is sized small enough so that said head will break away from said shank upon application of a predetermined torque by said rotary driver if engagement between said knurls and said steel member prevents rotation of said fastener.

6. A fastener for removably fastening a work piece to a steel member comprising:

an elongate shank having an axis, a head for receiving an axial impact for driving said fastener axially forwardly, said head having a recess for receiving a rotary driver, and a generally pointed tip;

said shank having generally helical grooves for imparting clockwise rotation as said fastener is driven axially forwardly, wherein said generally helical grooves intersect generally annular grooves defining knurls, a plurality of said knurls each including a trailing portion for increased pullout strength, a lateral cutting edge for cutting away said steel member when said fastener is rotated in a counterclockwise direction by said rotary driver, and an axially leading portion tapered toward said generally pointed tip;

wherein said helical grooves have a helical angle of between about 5 degrees and about 11 degrees with respect to said axis.

* * * * *